US005503706A

United States Patent [19]

Nicholson et al.

[11] Patent Number: 5,503,706

[45] Date of Patent: Apr. 2, 1996

[54] UNIVERSAL LABELING AND CONTAINER INFLATION APPARATUS

[75] Inventors: Peter Nicholson, Upland; Martin Davidow, Claremont, both of Calif.

[73] Assignee: Avery Dennison Corporation, Pasadena, Calif.

[21] Appl. No.: 116,795

[22] Filed: Sep. 7, 1993

Related U.S. Application Data

[63] Continuation-in-part of Ser. No. 872,175, Apr. 22, 1992, abandoned.

[51] Int. Cl.[6] .......... B32B 31/00

[52] U.S. Cl. .......... 156/566; 156/156; 156/287; 53/88

[58] Field of Search .......... 156/156, 285, 156/287, 538, 566, DIG. 18, DIG. 25; 53/88, 98, 110; 141/67, 114, 165, 313

[56] References Cited

U.S. PATENT DOCUMENTS

| | | | |
|---|---|---|---|
| 2,981,432 | 4/1961 | Flood . | |
| 3,058,514 | 10/1962 | Flood . | |
| 3,064,714 | 11/1962 | Flood . | |
| 3,261,734 | 7/1966 | Long . | |
| 3,656,360 | 4/1972 | Fix . | |
| 4,066,732 | 1/1978 | Redmond, Jr. . | |
| 4,124,164 | 11/1978 | Bachman | 239/533.15 |
| 4,180,105 | 12/1979 | Harvey . | |
| 4,192,703 | 3/1980 | Brown . | |
| 4,239,569 | 12/1980 | Harvey . | |
| 4,315,795 | 2/1982 | Jodrey et al. . | |
| 5,043,140 | 9/1991 | Dickey . | |
| 5,259,912 | 11/1993 | Cline | 156/156 X |

*Primary Examiner*—James Engel
*Attorney, Agent, or Firm*—Poms, Smith, Lande & Rose

[57] ABSTRACT

An inflation apparatus is described for a labeling machine for placing labels on containers. A sealing element seals the opening of a container whereby the sealing element covers the opening without substantial insertion of the sealing element into the opening in the container. A wall in the sealing element defines an opening through the sealing element for passing an inflation gas through the sealing element and into the container. A gas supply and conduit are provided for connecting the gas supply to the opening in the sealing element. The invention is particularly suited to in-line labeling machines.

5 Claims, 6 Drawing Sheets

FIG. 5
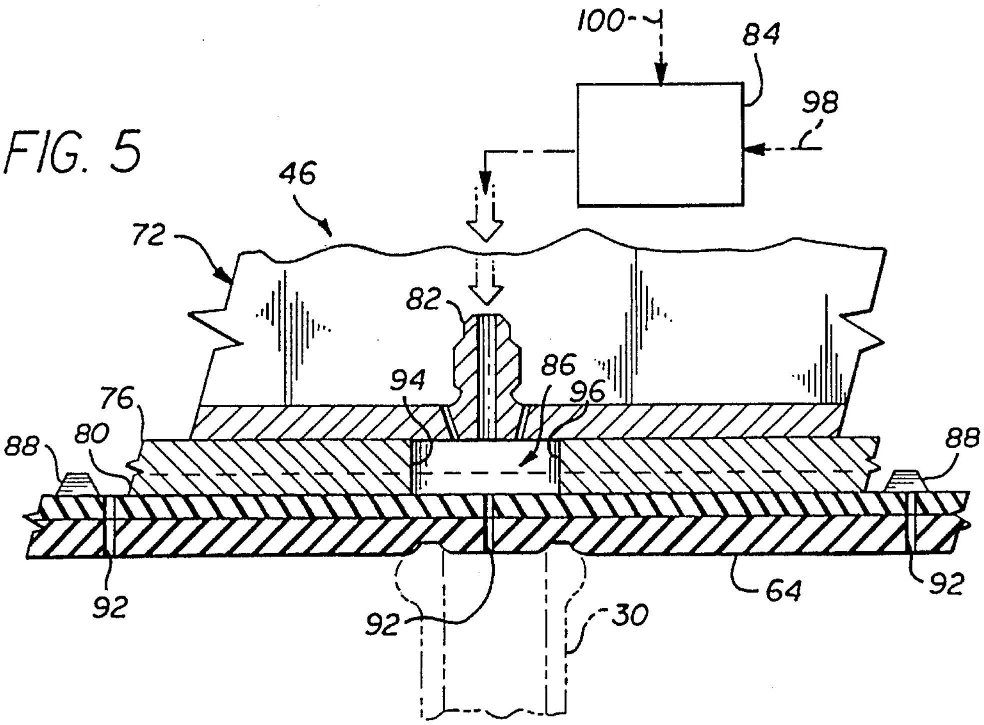
FIG. 8
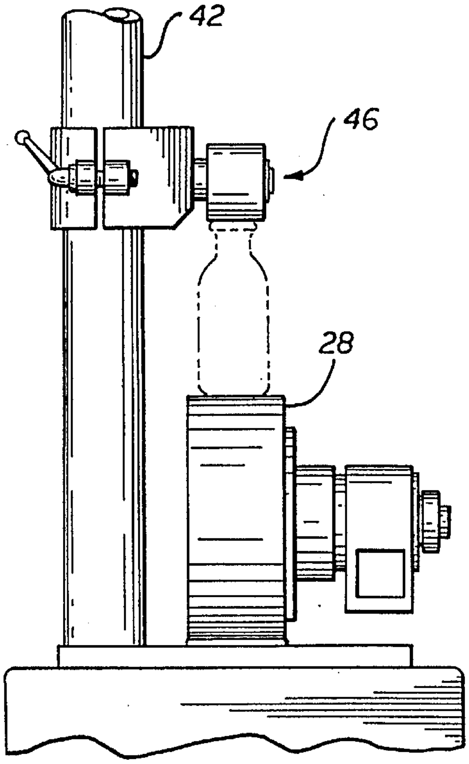
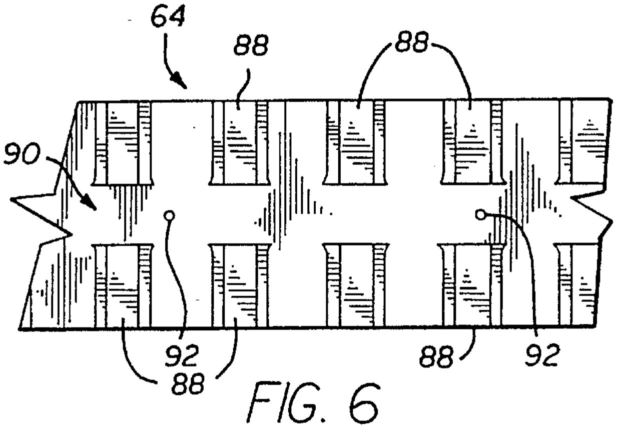
FIG. 6
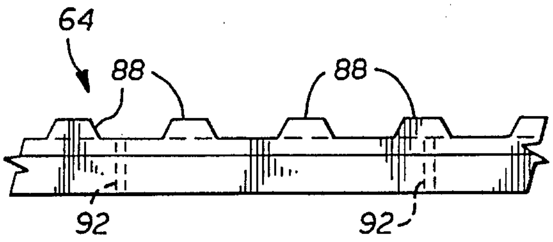
FIG. 7

FIG. 12
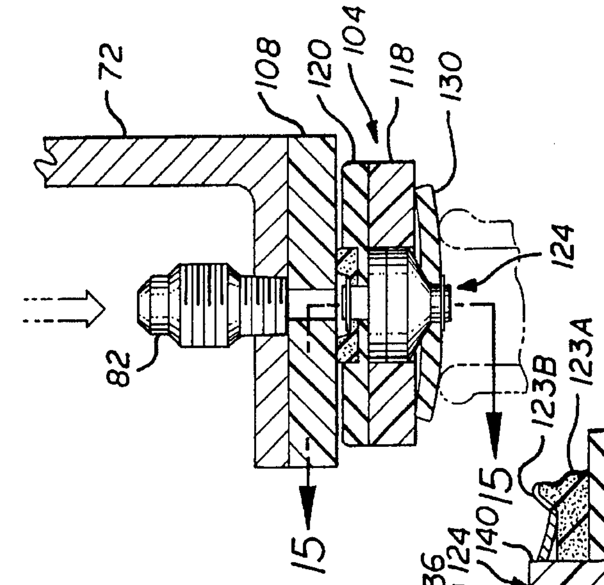
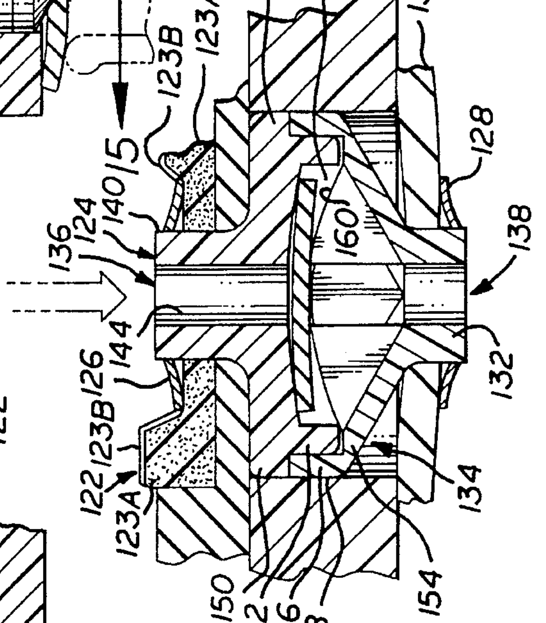
FIG. 15
FIG. 13
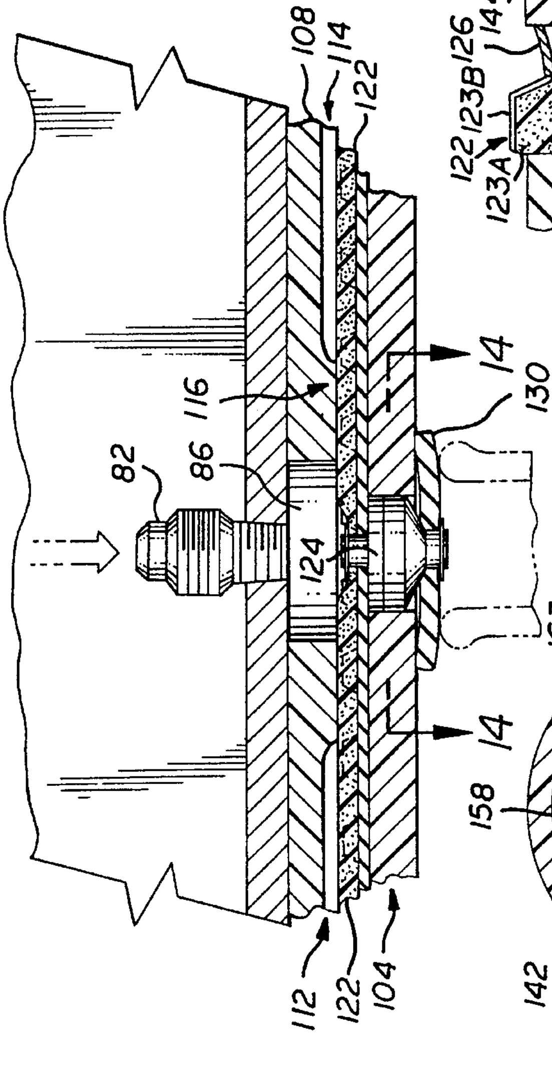
FIG. 14
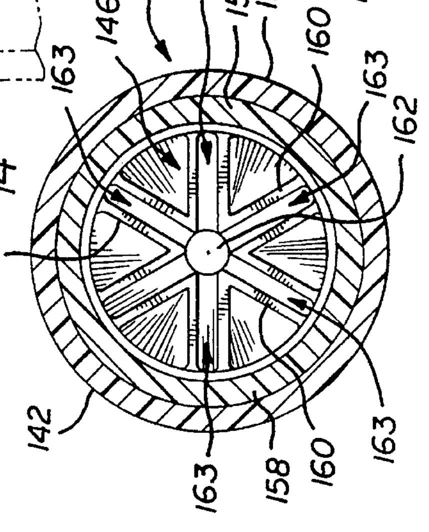

UNIVERSAL LABELING AND CONTAINER INFLATION APPARATUS

CROSS-REFERENCE TO RELATED APPLICATIONS

This application is a continuation-in-part of application Ser. No. 07/872,175 filed Apr. 22, 1992, now abandoned.

BACKGROUND OF THE INVENTION

1. Field Of The Invention

The present invention relates to automatic labeling systems, and more specifically to inflation apparatus for inflating or pressurizing containers to be labelled with such systems.

2. Related Art

Many different labeling apparatus have been previously constructed. One such machine is shown and described in U.S. Pat. No. 4,192,703 issued to Avery International Corporation, the predecessor in interest to the Assignee of the present invention, the specification and drawings of which is incorporated herein by reference. The apparatus disclosed therein is known as the Model 7005. The Model 7005 can side label, top label, three panel label, front and back label and also can wrap-around label a round bottle or other round product.

In many labeling applications, an empty bottle or other container, to be filled later, passes before a label applicator station where a suitable label is applied to the container. Typically, a minimum amount of pressure is used by the applicator when applying the label to the container to adequately adhere the label to the container. A considerable amount of pressure can be applied when applying labels to rigid containers such as glass bottles and the like. However, many product suppliers use plastic containers to decrease the weight of the product as marketed and to avoid the use of glass, which has a potential for breaking.

To reduce material cost and to provide a more light weight container, many product suppliers are using plastic containers having smaller and smaller wall thicknesses. As the container wall thickness decreases, the maximum labeling pressure that can be applied to the wall of the container, without causing the container to collapse, buckle or otherwise change shape, also decreases. Where the pressure necessary to adequately apply a label to a container is greater than the buckling pressure for the container wall, other means must be provided for either preventing buckling of the container wall or for applying a label with less pressure.

One solution, in a method and apparatus for decorating bottles and the like at high speeds, uses a continuously rotating turret wherein bottles are inflated through a nozzle lowered into the neck of the bottle. Raising and lowering of the inflating nozzle and the flow of inflating air is controlled by special valving apparatus. Such an apparatus uses a different approach for transporting, labeling and inflating the bottles than the apparatus and method to which the current invention is directed.

There is a need therefore for an inflation apparatus for use in a labeling machine for placing labels on containers while the containers are moved linearly. There is also a need for an inflation apparatus for a labeling machine which achieves inflation of the containers without inserting any apparatus into the container opening.

There is further a need for an inflation apparatus which can be easily retrofit onto existing labeling apparatus such as those having linear container transport and an overhead hold-down assembly. These needs are met by the present invention.

SUMMARY OF THE INVENTION

In accordance with the present invention, an inflation apparatus is provided which stabilizes containers while they are being labelled, even while the containers are moving linearly, and also wherein inflation of the containers can be achieved without insertion of apparatus into the opening of the container. In accordance therewith, an inflation method and apparatus according to the present invention includes a sealing element for sealing the opening of a container whereby the sealing element covers the opening and a gas is passed through the sealing element and into the container to pressurize the container. In a preferred form of the invention, an endless web provides the seal over the opening of the container whereby the seal is maintained even while the container is linearly transported. Additionally, in a further preferred form of the invention, valving for the inflation apparatus is achieved by the web material moving beyond an active inflation zone in the apparatus. Alternatively, valving can be accomplished through suitable pneumatic apparatus operated in conjunction with container location sensors so that the container is inflated only when the container is passing between two defined points.

In a further form of the present invention, an inflation method and apparatus is provided whereby the container is sealed by a longitudinally linearly movable web sealing the opening of the container without insertion of any inflation apparatus into the container. In the preferred form of the invention, the container moves linearly past a labeling station and the seal is provided by a linearly movable web material sealing the top of the opening of the container as the container moves linearly in front of the labeling station.

In another form of the present invention, valving can be accomplished through a one-way valve arrangement situated between the container opening and a rigid structure against which the endless web bears. Preferably, the valving arrangement is a one-way valve incorporated as part of the endless web so that the valve moves with the container as the container is linearly transported. In a still further preferred form of the invention, the inflation apparatus is positioned upstream from the labeling station and the valving substantially maintains the pressure in the container as the container moves from the inflation zone to the labeling station.

In a further preferred form of the invention, the valving function is provided by a small one-way valve which provides a good seal when the pressure on the bottle side of the valve is higher than on the opposite side and which still provides adequate fluid flow as the container is being inflated. Preferably, the valve includes an element for providing an airtight seal, such as a neoprene or similar material for sealing the valve and maintaining pressure in the pressurized container.

In a still further preferred form of the invention, the endless web is a laminated belt of various materials. In one preferred embodiment, the portion of the belt which bears against a rigid support in the form of a back-up bar includes a foam rubber base to which is bonded nylon fabric to be exposed to the back-up bar. This portion of the laminate structure preferably extends only a portion of the width of the web belt along the centerline thereof. This portion of the laminate preferably minimizes any frictional wear which may occur between the web belt and the back-up bar, thereby minimizing the creation of any contaminates such as particulates, and the like. The endless belt preferably also includes a container sealing element surrounding the valve incorporated in the web belt for sealing the mouth of a respective container when the mouth is in contact with the belt.

With the method and apparatus according to the present invention, the inflation method and apparatus can be used with a wide range of container sizes and dimensions, including a wide range of container opening sizes. The apparatus is also simple and easy to retrofit on existing linear labeling apparatus.

It is therefore an object of the present invention to provide an apparatus for labeling machines which permits application of labels to non-rigid containers.

It is a further object of the present invention to provide an inflation apparatus for use with labeling machines for inflating containers to permit application of labels to non-rigid containers.

It is another object of the present invention to provide an inflation method and apparatus for inflating non-rigid containers moving linearly. It is a related object of the present invention to provide an inflation method and apparatus which seals the opening of a container even while the container moves linearly.

It is another object of the present invention to provide an inflation method and apparatus for a labeling machine which can be easily retrofit onto existing labeling machines which move containers linearly.

These and other objects of the present invention are achieved through the method and apparatus shown in the drawings and described in more detail in the following detailed description of the preferred embodiments.

BRIEF DESCRIPTION OF THE DRAWINGS

FIG. 5 is a partial longitudinal sectional view of a hold-down assembly and inflation apparatus according to the present invention.

FIG. 6 is a top plan view of a portion of an endless web belt for use with the present invention showing openings for inflating containers.

FIG. 7 is a side elevation view of the web belt of FIG. 6.

FIG. 8 is a rear elevation view of the conveyor and hold-down assembly of FIG. 1.

FIG. 12 is a transverse cross-sectional view of a top hold-down belt assembly and inflation apparatus according to the embodiment of the invention of FIG. 11 for sealing the mouth of a container and inflating the container.

FIG. 13 is a more detailed and partial longitudinal section of the hold-down belt assembly and inflation apparatus according to the embodiment of the invention shown in FIG. 11.

FIG. 14 is a transverse cross-section of a valving apparatus for use with the invention depicted in FIGS. 11–13 taken along line 14—14 of FIG. 13.

FIG. 15 is a partial cross-section of the valve and web belt of the invention of FIGS. 11–13 taken along line 15—15 of FIG. 12.

DETAILED DESCRIPTION OF THE PREFERRED EMBODIMENTS

Figure 1:
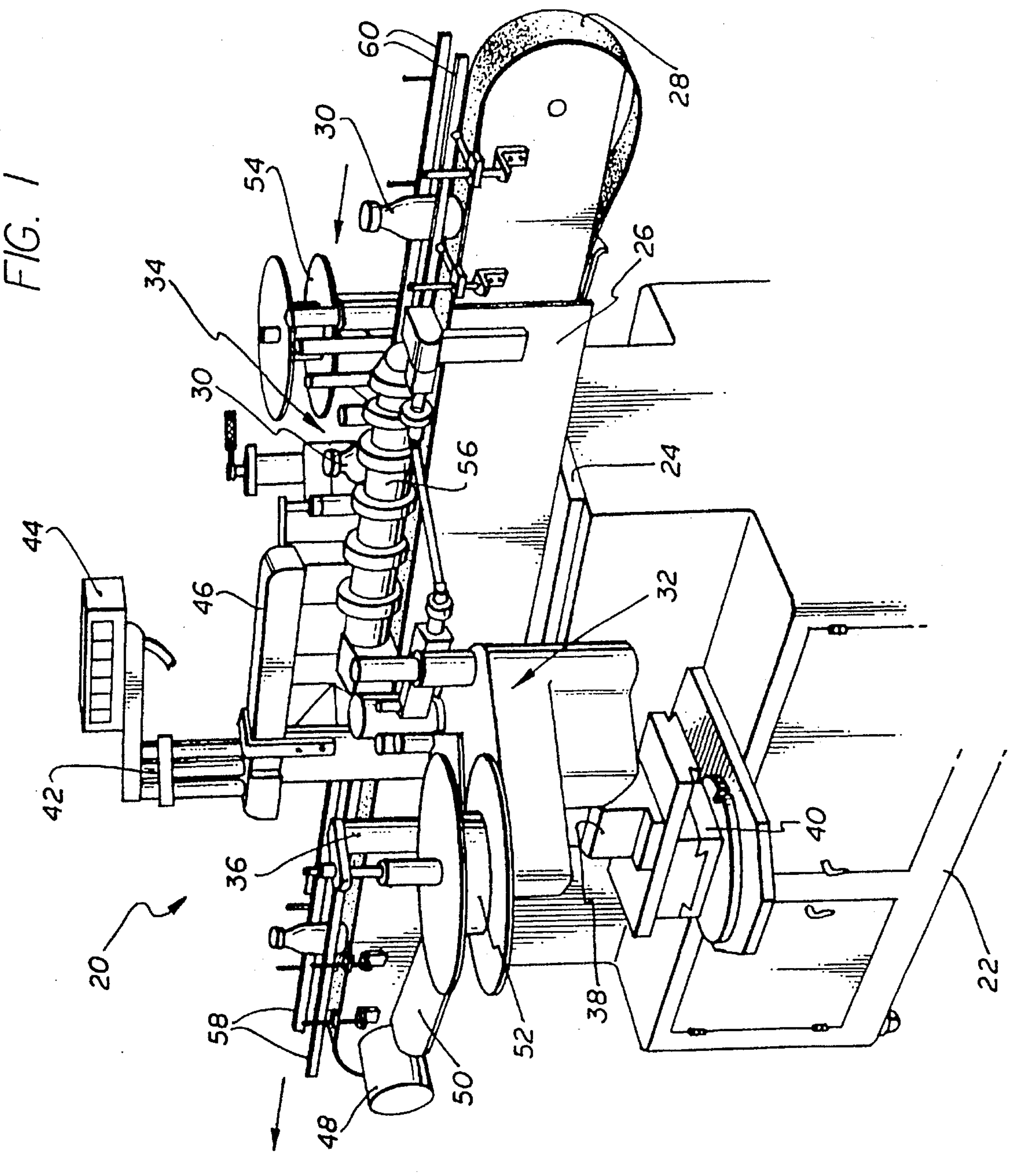
FIG. 1 is a partial prospective view of a labeling apparatus for use with the present invention.

In accordance with the present invention, an inflation apparatus is provided which allows non-rigid containers to be used with an in-line labeling apparatus wherein the containers can be inflated and sealed even while they are transported linearly. In the preferred embodiment, the inflation apparatus is used with a labeling machine 20 (FIG. 1) which applies labels to the front and back of containers. The labeling machine 20 also applies labels to top surfaces, and in a wrap around arrangement for round bottles or other similar products. The labeling machine shown in FIG. 1 is shown for illustrative purposes only, and is intended to represent an exemplary machine with which the inflation apparatus can be used. Other labeling machines can be modified in a suitable manner as would be apparent to those skilled in the art to achieve the purposes intended by the present invention. The labeling machine 20 shown in FIG. 1 is substantially like the Avery Model 7005 machine. In that machine, a cabinet 22 has an inverted "T"-shaped cross-sectional configuration having a deck plate 24 mounted on the central raised portion of the cabinet. A conveyor assembly 26 is mounted on the deck plate 24, and includes a conveyor belt 28 moving from right to left as shown in FIG. 1 from an input to an output. The conveyor belt 28 carries containers such as bottles 30 in the direction shown for labeling by two labeling heads, one of which is shown at 32 in the foreground of FIG. 1. A similar head 34 is mounted on the other side of the conveyor 26. These automatic label applicator heads 32 and 34 may be the standard heads produced by the Assignee of the present invention.

The applicator heads 32 and 34 are adjustably mounted to provide flexibility in positioning of the applicator heads. Preferably, the head 32 is mounted on a polished support column 36, which is in turn mounted on a base 38. Oppositely directed guides are provided between the upper base 38 and the lower base 40 to allow movement both toward and away from the conveyor assembly and also in a direction parallel to the direction of movement of the conveyor belt 28.

Preferably, a second vertical support column 42 is mounted on the deck plate 24 for supporting a hold-down belt assembly 46, described more fully below. An additional support column (not shown) may also be used at the opposite end to further support and stabilize the hold-down belt assembly.

The conveyor belt 28 is driven through an external gear reducer 48 and a drive shaft rod mounted within a protective shield 50. The conveyor drive shaft is described more fully in the U.S. Pat. No. 4,192,703, incorporated herein by reference.

The two applicators 32 and 34 apply labels to both sides of the bottles 30, slightly to the left of the center of the conveyor belt 28, as shown in FIG. 1. The reels for rolls of labels are shown at 52 and 54, respectively. A variable pitch screw 56 is positioned above the conveyor belt assembly. The screws 68 are variable in pitch in order to pick up stationary bottles which are positioned at the right-hand end of the conveyor belt 28 to feed them forward at the normal speed of the conveyor belt 28 as they reach the applicators 32 and 34. The applicators 32 and 34 are positioned so that the labels may be applied to the bottles as they move along the conveyor belt 28. Either a single feed screw or dual synchronized feed screws may be provided, depending on the shape of the product to be labelled, as is known to those skilled in the art.

The hold-down belt assembly 46 and the retaining guide rails 58, positioned above the surface of the conveyor belt at the left-hand end of FIG. 1, stabilize the bottles while they are being transported on the conveyor belt 28 and labelled at the applicators 32 and 34. Input guide rails 60 at the right-hand end of the conveyor belt 28 also stabilize the bottles as they approach the screws 56.

Figure 2:
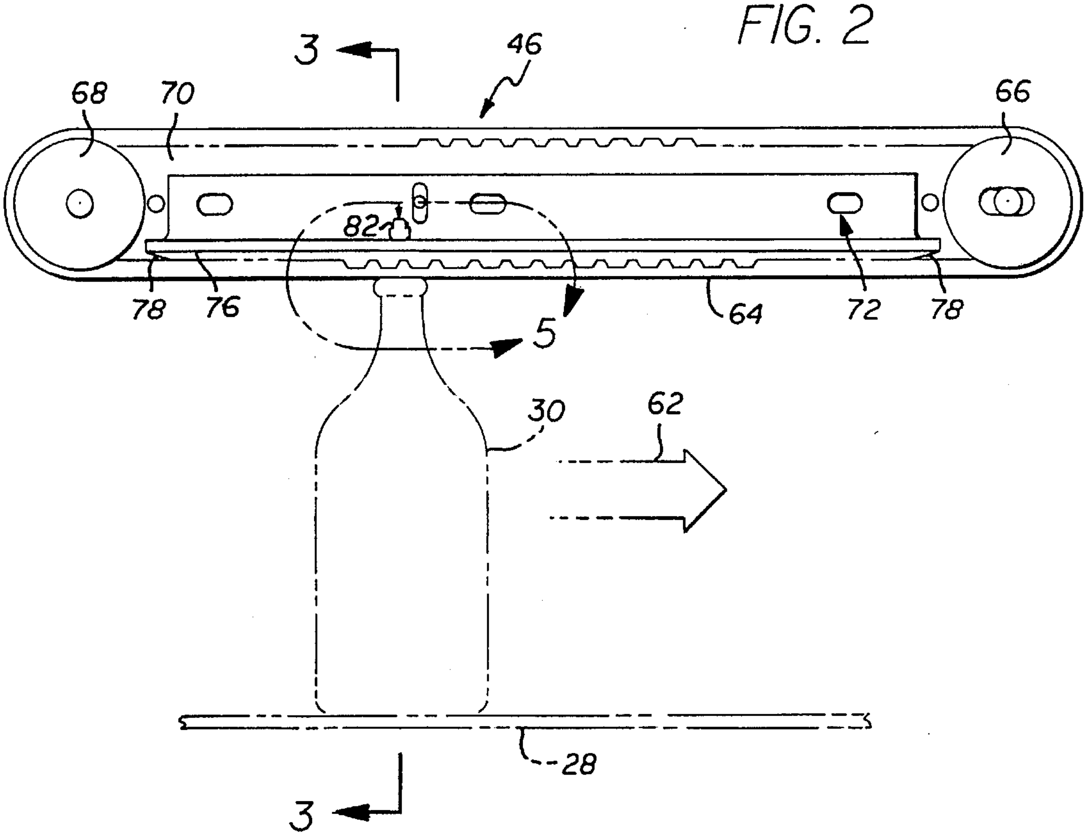
FIG. 2 is a side elevation view of a conveyor and top hold-down assembly for use with the present invention.
Figure 4:
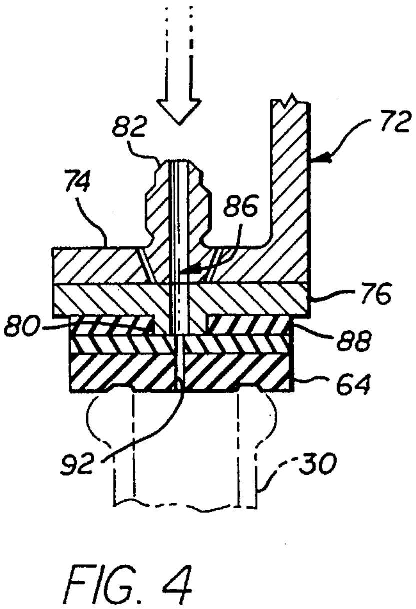
FIG. 4 is a more detailed and partial transverse cross-section of the hold-down assembly and inflation apparatus according to the present invention showing a web material for sealing the opening of a container.
Figure 3:
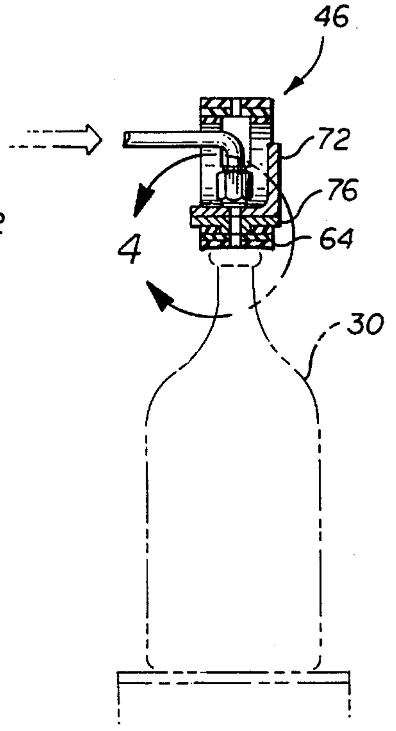
FIG. 3 is a transverse cross-sectional view of a top hold-down assembly and inflation apparatus according to the present invention for sealing the mouth of a container and inflating the container.

The hold-down belt assembly 46 provides a top support and hold-down mechanism for the bottles 30. The hold-down belt assembly preferably stabilizes the top of the bottle as the bottle is moved by the conveyor belt 28 and the hold-down belt assembly 46. Bottles are moved in the direction of the arrow 62 (FIG. 2) by the combined motion of the conveyor belt 28 and a top hold-down belt 64. The hold-down belt 64 (FIGS. 2–8) is an endless web belt driven around a drive sprocket 66 and an idler sprocket 68 each mounted at respective ends of a frame 70, in turn mounted to the vertical support column 42 (FIG. 1). The frame also supports a vertically adjustable belt backup bar 72 adjustably mounted by an upright flange on the backup bar to the frame. The backup bar includes a horizontal flange 74. The belt backup bar 72 preferably extends substantially the entire length of the frame 70 between the drive sprocket 66 and the idler sprocket 68. The backup bar 72 is typically adjusted so that the bottom surface of the belt 64, as it moves under the bar 72, is positioned below that portion of the belt extending around the bottom of the sprockets so that the belt gradually makes contact with the top of a bottle as the bottle approaches the belt 64. This gradual ramp effect is known to those skilled in the art and is not shown in FIG. 2.

A backup bar wear strip 76 is mounted to the horizontal flange 74 of the belt backup bar 72 and extends substantially the entire length of the belt backup bar 72. The wear strip 76 is substantially rectilinear in bottom plan view and includes ramp portions 78 whereby the bottom surface of the wear strip at each end gradually converges, at an approximately 15 degree angle to the horizontal, to the end of the bottom surface of the belt backup bar 72. The ramp portions 78 provide a gradual entrance and exit for individual bottles into contact with the hold-down belt 64 and then out of contact with the hold-down belt as the bottle exits from underneath the top hold-down belt.

In transverse cross-section (FIG. 4), the wear strip 76 is substantially rectilinear except for a guide rail 80 extending longitudinally along the bottom center of the wear strip 76. The guide rail 80 serves as a guide and stabilizer for the hold-down belt 64 and part of a sealing surface between the wear strip and the belt 64. The wear strip is mounted to the horizontal flange of the belt backup bar 72 by a number of suitable fasteners. The wear strip is preferably formed from Delrin or other suitable material which is strong and has a low coefficient of friction.

A pneumatic fitting 82 is threaded into a suitably threaded opening in the horizontal flange 74 of the belt backup bar 72 for connecting a gas supply 84 (FIG. 5) to an air passageway through the wear strip 76, described more fully below. The fitting 82 is preferably a pneumatic fitting suitable for accepting pneumatic tubing for supplying air from the gas supply 84. The fitting may be positioned longitudinally on the belt backup bar 72 at any suitable location, preferably prior to the point of labeling, in order to provide air to inflate and pressurize bottles to be labelled. The fitting 82 opens out into an air manifold 86 (FIGS. 4 and 5) formed in the wear strip 76. The air manifold 86 extends vertically through the entire height of the wear strip and the guide rail 80, and opens at the bottom of the guide rail. The air manifold 86 extends longitudinally of the wear strip 76 a sufficient distance to allow adequate pressurization of a bottle. Any number of manifolds can be provided in the wear strip in order to pressurize a number of bottles as the bottles travel with the conveyor belt 28. In the preferred embodiment, the longitudinal length of the manifold is no greater than the pitch of the transported bottles, namely the center-to-center distance between adjacent bottles.

The manifold in one preferred embodiment is positioned approximately one foot upstream from the labeling station to allow sufficient time for the bottle to be pressurized before labeling begins. In another embodiment, the manifold is located one bottle pitch upstream from the start point for the labeling station, so that the bottle is properly pressurized before labeling begins. A proper seal is thereafter maintained between the bottle opening and the belt and between the belt and the wear strip, even after the hole 92 over the bottle opening has passed beyond the manifold. In the preferred embodiment, a silicone or other air tight seal (not shown) is formed between the horizontal flange 74 of the support bar and the wear strip 76 around the manifold opening. Other seals may also be formed as would be apparent to those skilled in the art to reduce any possibility of air leakage in the system.

The hold-down belt 64 is also substantially rectilinear in transverse cross-section and includes, along the inside surface of the belt, a number of tractor teeth 88 for engagement with the sprocket 66 for driving the belt around the top hold-down assembly. The tractor teeth 88 are oriented in pairs with their outside edges coincident with the respective outside edge of the hold-down belt 64 to be driven by the pulley 66. Each of the teeth in a given pair extend inwardly and terminate at respective inside surfaces to define a guide rail groove 90 (FIG. 6) for stabilizing and guiding the hold-down belt along the wear strip 76 and for forming a sealing surface between the guide rail and the belt as the portion of the belt opposite the bottle opening moves along the hold down bar. As a result of pressure created by the bottle neck against the underside of the hold-down belt, because the bottle 30 is sandwiched between the conveyor 28 and the hold-down belt 64, a seal is formed between the bottle opening and the belt 64 and between the surface of the groove 90 and the mating surface of the guide rail 80 as the bottle is transported.

In the preferred embodiment, a plurality of holes 92 (FIGS. 4–7) are formed in the hold-down belt oriented at spaced locations along a center line of the hold-down belt and down the middle of the groove 90. Each hole extends from the surface of the groove 90 to the opposite surface of the hold-down belt so that air supplied by the gas supply 84 forced into the manifold 86 passes through each hole and into the bottle 30 located directly underneath the hole 92 to inflate the bottle and maintain a suitable pressure while a label is placed on the bottle. The holes 92 are preferably evenly spaced apart relative to one another a distance corresponding to the center-to-center pitch between adjacent bottles, which generally may correspond to the pitch of the variable pitch screws 56 feeding individual bottles underneath the hold-down belt assembly 46. In one embodiment, the hold-down belt is 0.25 inch thick formed from 40 duro "A" cast polyurethane with ⅛ inch diameter holes equally spaced around the continuous belt. The belt is preferably 1.5 inches wide, at least as wide as the bottle openings, and the teeth preferably 0.558 inch wide, making the groove 90 about 0.385 inch wide. The teeth 88 have a height off the 0.25 inch belt of 0.135 inch. The holes 92 can be located along the belt independent of the location of the teeth. As would be apparent to those skilled in the art, the number of holes times their pitch equals the length of the belt.

It should be noted that the gearing for the conveyor belt 28 should be such as to precisely position the opening of each bottle under a respective hole 92 in the hold-down belt 64 so that, as the conveyor belt 28 and the top hold-down belt 64 continue to run, the bottles do not go out of phase with the holes. Otherwise, the bottles will not match up with the pressurizing holes and the bottles will not be pressurized.

The gas supply 84 includes standard components necessary to supply clean, dry air or other suitable gas at the desired pressure to inflate the bottles. The supply typically would include a compressor, regulators, a valve solenoid, a filter such as a coalescing filter to clean the air, and a timer, in order to actively control the injection of air into the manifold.

As is known to those skilled in the art, the amount of time necessary to place a label on the bottle 30 depends on the size of the label and the transport speed of the bottle as it is being transported by the conveyor belt 28 and the top hold-down belt 64. Preferably, a valving system controls the pressurization of the bottles 30 so that the bottles are fully pressurized at least by the time each bottle begins to be labelled. In one preferred embodiment, the valving for controlling pressurization of individual bottles 30 is accomplished passively by the inherent movement of the top hold-down belt 64 relative to the manifold 86. As an individual pressurization hole 92 surrounded by the rim of a bottle 30 passes the forward edge 94 of the manifold 86, pressurization of the bottle 30 begins. In this embodiment, valving for pressurization of the bottle occurs when the hole 92 passes the forward edge 94 of the manifold and terminates pressurization as the hole 92 passes the rearward edge 96 of the manifold 86. The bottle remains pressurized thereafter. The distance the bottle 30 travels while being pressurized is determined by the longitudinal length of the manifold 86 as determined by the distance between the forward and rearward edges of the manifold, 94 and 96 respectively. The time duration of pressurization while under the manifold is determined by the longitudinal length of the manifold and the transport rate of the conveyor belt 28 and top hold-down belt 64.

In an alternative embodiment, valving can be controlled by a valving control input signal 98 input to the gas supply 84, which is powered through a suitable power source 100. The valving control input signal may come from a suitable source such as a sensor and fiber optic cable for determining when a bottle to be labelled has passed a predetermined point on the conveyor 28 upstream from the labeling station. The valving control input signal can then be used by the gas supply 84, through suitable circuits or software, to determine when the bottle should be pressurized. The time duration for pressurizing the bottle can be determined either by a further sensor or by a timing circuit in the gas supply 84. Alternatively, the sensor may have a timer incorporated within it to be adjusted by an operator according to when the gas supply is to operate.

In the embodiments described, the linear, in-line labeling machine can easily label non-rigid containers, such as plastic bottles, easily and efficiently. Air can be provided at any number of locations to pressurize the bottles at selected individual locations at any given time and in any given sequence, or to pressurize a plurality of bottles all at the same time. In the preferred embodiment, the manifolds 86 are no longer than the pitch between adjacent bottles, and the inflation holes 92 are preferably no closer than the pitch of the bottles. The length of the manifold may depend on the transport speed for the bottles and the bottle size. The pressure supplied by the gas supply 84 may be in the range of 2 to 20 PSI and 5 to 10 PSI has been found to be adequate. The pressure supplied by the gas supply may be proportional to bottle volume, the duration of the inflation, the size of the bottle opening, and similar considerations. It is believed that a bottle pressure of 1 to 5 PSI should be adequate for most bottles.

Figure 9:
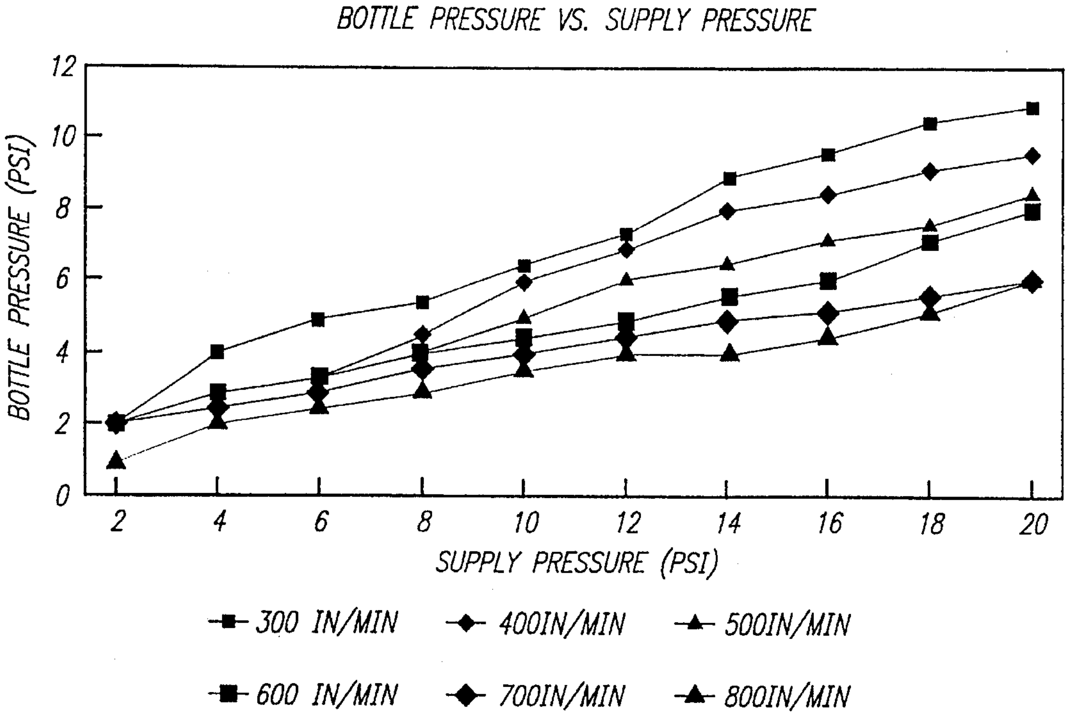
FIG. 9 is a graphic depiction of bottle pressure versus supply pressure for an inflation apparatus according to the present invention using a standard rigid bottle.
Figure 10:
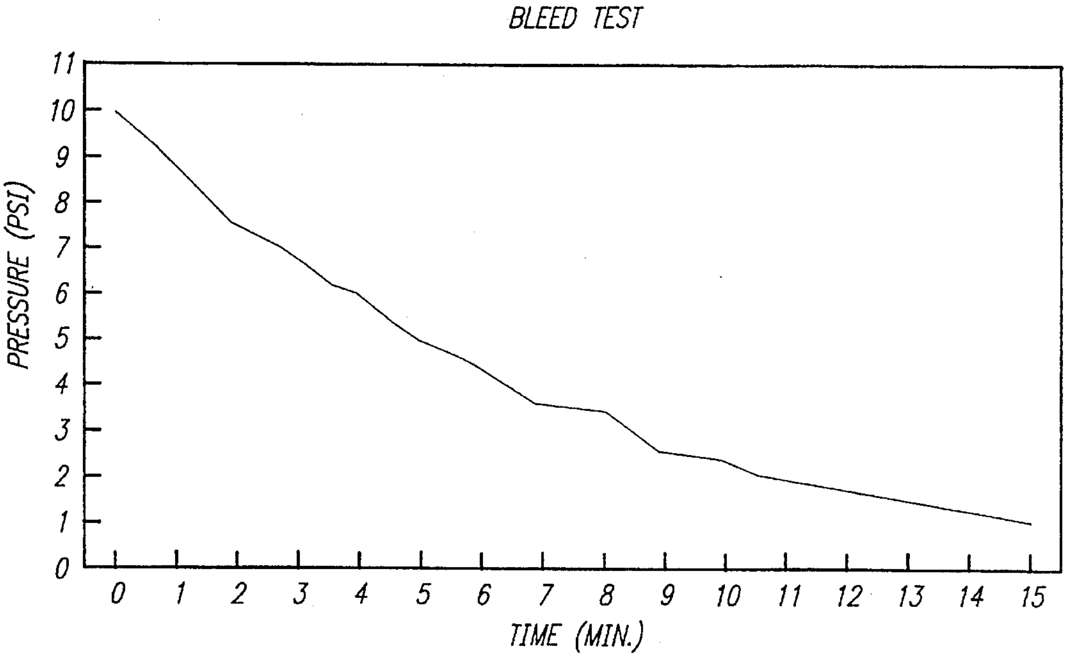
FIG. 10 is a graphic depiction of the results of a bleed test for the inflation apparatus according to the present invention.

Results of pressurization tests are shown in FIGS. 9 and 10. FIG. 9 shows bottle pressure versus supply pressure in PSI for six different product transport speeds. The data points are the average of three trials, with the measurements being made at the point of labeling. The test product is a standard bottle formed from an aluminum canister with a built-in pressure gage. FIG. 10 shows the results of a bleed test wherein the standard aluminum canister is pressurized to 10 PSI and let stand at the end of the top hold-down belt. The internal pressure is monitored as a function of time. As can be seen for the length of time that a container would be resident under the top hold-down belt, namely less than a minute, the change in pressure is negligible. These tests were conducted with the top hold-down belt assembly being adjusted down over the top of the bottle according to the standard procedure for adjusting the height of the top hold-down belt assembly.

In a further form of the present invention, a valving system and a different top hold-down belt arrangement may be provided (FIGS. 11–15). The additional valving provides greater pressure stability in the bottle as the bottle is moved along the conveyor belt. The alternative belt design minimizes frictional drag and wear between the belt and the belt back-up bar, or wear strip, and also minimizes creation of possible contaminants arising from the frictional contact. These alternative features enhance the ability of the system to maintain pressure in the bottles even while the bottles are being transported from the inflation area to the bottle labeling heads. They also minimize the possibility that the walls of the container deflect as the label is applied.

As in the previously-described design, the frame 70 supports the drive sprocket 66 and the idler sprocket 68 in the same manner as described previously. The frame 70 also adjustably supports the belt back-up bar 72 in a manner similar to that previously described. The belt back-up bar is adjustable relative to the frame, both vertically and horizontally. The bottles 30 are transported on the conveyor belt 28 in the direction shown by arrow 62 as the conveyor belt moves in the direction shown by arrow 102. The bottles are transported by the conveyor belt 28 and a top hold-down belt 104 from an air-inflate position 105 represented by the location of the fitting 82 on the belt back-up bar 72, to a labeling station represented by the labeling head 32 and the label feed mechanism 106. In the preferred embodiment, the top hold-down belt and valving arrangement maintains the pressure in the bottle 30 as the bottle moves from the inflate station to the labeling station so that the bottle is not being inflated at the same time as the label is being applied, and the internal bottle pressure has and remains stabilized.

Figure 11:
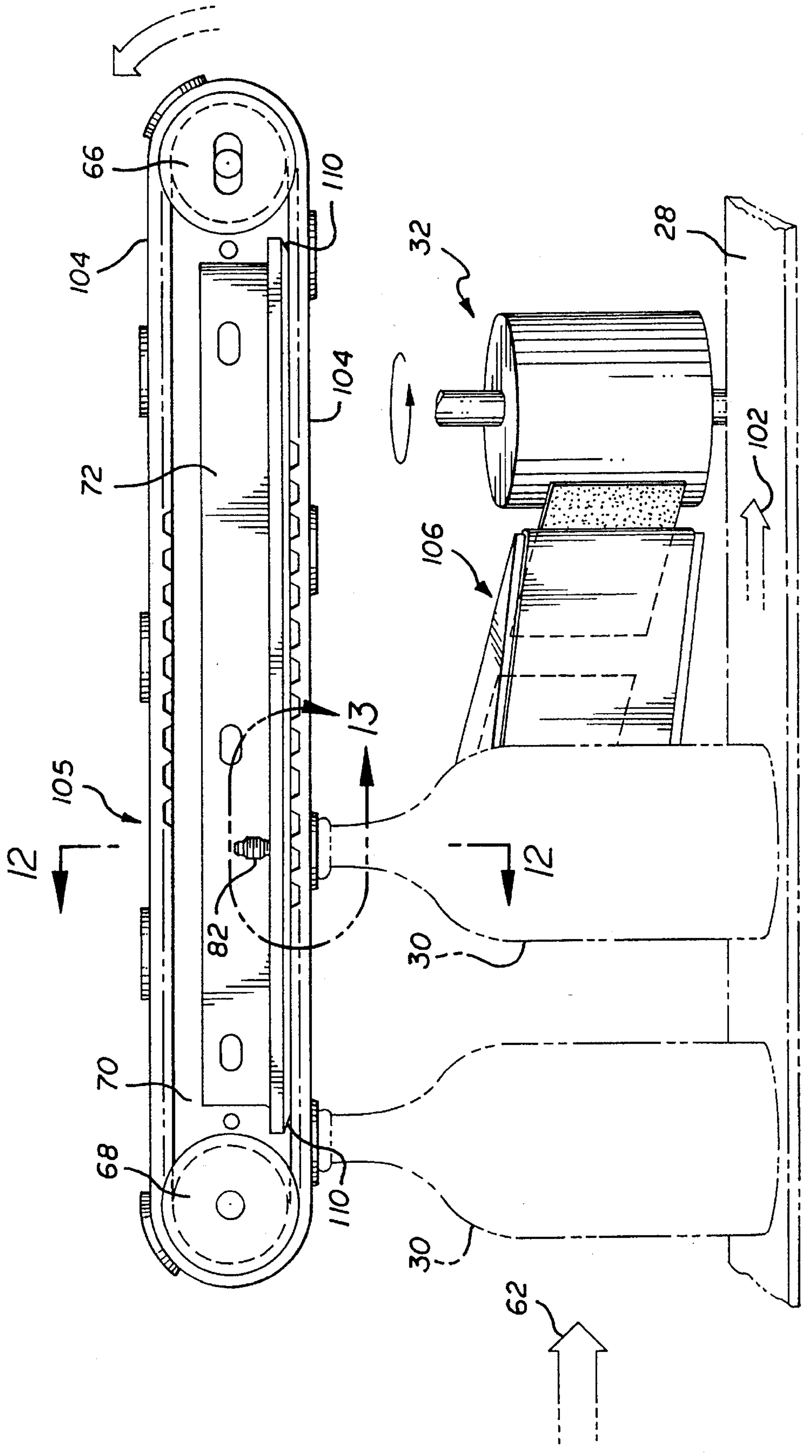
FIG. 11 is a side elevation view of a conveyor and top hold-down belt assembly in accordance with another aspect of the present invention.

In the embodiments shown in FIGS. 11–13, the belt back-up bar 72 has substantially the same structure and function as previously described. The belt back-up bar supports a wear strip 108 against which is pressed the top hold-down belt 104 as a respective bottle 30 is positioned between the top hold-down belt 104 and the conveyor belt 28. The wear strip 108 also includes ramp portions 110 to facilitate the transition of the bottle as the bottle enters underneath the belt back-up bar 72 or exits. The wear strip 108 preferably includes an upstream groove 112 and a downstream groove 114 (FIG. 13) extending longitudinally upstream and downstream, respectively, from the inflate station 105 for minimizing frictional drag between the top hold-down belt 104 and the wear strip 108 in areas other than the inflate station, and for channeling any particulates which may be created away from the valving and bottles. The adjacent ends of the grooves 112 and 114 define a boss 116 extending before and after the air manifold 86 and also defining the lower extent of the air manifold 86 where the top hold-down belt 104 passes. The wear strip 108 is preferably formed from Delrin, and in the preferred embodiment shown in FIGS. 11–13, is approximately 1.75 inches wide. The grooves 112 and 114 are centrally located along the longitudinal dimension of the wear strip and are preferably 0.75 inch wide. The air manifold 86 preferably extends from upstream to downstream approximately 2.0 inch and is approximately 0.13 inch wide, transversely of the wear strip. The grooves 112 and 114 are preferably 0.09 inch deep.

The top hold-down belt is preferably a laminate of a primary support layer 118, preferably formed from polyurethane, and cast or bonded onto a mating surface of a timing belt layer 120. The polyurethane is preferably ¼ inch thick. The timing belt layer 120 has the conventional construction of exposed teeth for being driven by the sprocket 66, and has cloth or thread imbedded in the underlying layer for strength and durability. A groove is formed in the timing belt layer 20 in a similar manner as the previously described embodiment except that the groove is 0.625 inch in width and accepts a wear layer or wear material 122 (FIGS. 13 and 15) of approximately the same width for minimizing the frictional drag that may be created by movement of the top hold-down belt 104 against the wear strip 108. The wear layer 122 also seals between the top hold-down belt and the wear strip. The wear layer 122 is preferably 0.125 inch thick and formed from a laminate 123A of foam or sponge rubber such as noeprene or polychloroprene which is used in diving and swimming wet suits. A nylon surface material 123B for contacting the wear strip 108 is bonded to the foam rubber. The foam rubber of the wet suit material and the nylon surface is preferred over polyurethane since polyurethane creates excessive friction and wear. The wear layer 122 is preferably formed from foam rubber such as is supplied by Rubatex, Part No. R8514-S, along with an 820 grey nylon fabric.

In the embodiment of FIGS. 11–15, the holes 92 for passing air through the top hold-down belt are replaced by valve assemblies 124 (FIGS. 12–15). The top hold-down belt includes a plurality of valve assemblies 124 distributed equal distances apart linearly along the extent of the belt. The valves are positioned relative to one another in the same manner as the holes 92 were positioned in the previously-described embodiments. Each valve is held in place by spring metal retaining rings in the form of an inner retaining ring 126 and an outer retaining ring 128. The retaining rings are friction fit over the exposed cylindrical ends or necks of the valve and include teeth to engage the surfaces of the valve necks. The retaining rings sandwich the top hold-down belt. This arrangement for the valve and belt facilitates replacement of individual valves in the field, if necessary. The retaining rings can be removed so that a new valve can be substituted.

The outer retaining ring 128 also retains a preferably flat circular neoprene sealing disc 130 for sealing the mouth of a respective bottle when the bottle is pressed between the conveyor belt 28 and the top hold-down belt 104. The sealing disc 130 is preferably larger in diameter than the opening of the bottles being labeled. The sealing disc may also be formed from natural rubber. The sealing disc 130 extends over and frictionally engages a cylindrical neck 132 to seal between the sealing disc 130 and the valve 124 so that the sealing disc 130 and the valve close the bottle and can maintain the bottle pressure once established. The outer retaining ring 128 holds the sealing disk 130 in place on the valve 124.

In the preferred embodiment, the sealing disks 130 are preferably attached or formed on the top hold-down belt so as to conform to the surface of the belt as the belt moves, such as is shown at the upper and outer portions of the top hold-down belt in FIG. 11. The sealing disk is preferably approximately 1.5 inch in diameter (wider than the grooves 112 and 114) and approximately ⅛ inch thick. The opening through which the neck of the valve extends is approximately 0.25 inch.

The valve 124 is positioned and retained in a circular bore 134 formed in the first support layer 118 of the top hold-down belt. Each valve includes an inlet 136 and an outlet 138 for allowing air to pass from the manifold 86 through the valve and out the outlet 138 into the respective bottle sealed in position by the sealing disc 130. The outlet is formed in the cylindrical neck 132 of the valve and the inlet is formed in a similar cylindrical neck 140 extending through the timing belt layer 120, the wear layer 122. The cylindrical neck 132 and cylindrical neck 140 are connected by the valve housing 142 (FIGS. 14 and 15), all of which define an air passageway from the inlet to the outlet. The inlet 136 includes a cylindrical passageway 144 which terminates in a valve chamber 146, which contains a circular valve seal 148 for closing off the passageway 144 when the pressure differential across the seal 148 is greater on the downstream side, such as when pressure is removed from fitting 82 (FIGS. 11–13).

The valve body 142 is formed by the joining of an inner valve body 150, having an internal wall 152 with the outer valve body 154 having an outer wall 156 engaging the inner wall 152. The inner and outer valve bodies are described as inner and outer, respectively, to refer to their location relative to the inner and outer sides of the top hold-down belt.

The outer valve body 154 includes a substantially conically-shaped interior in which are formed inwardly extending baffle walls 158. The baffle walls 158 extend inwardly from the interior walls of the outer valve housing and include upper surfaces 160 which curve inwardly and upwardly toward the passageway 144. In the preferred embodiments shown in FIGS. 14 and 15, the baffle walls do not extend precisely radially, but instead along respective chords as can be viewed in FIG. 14. Each baffle wall terminates spaced apart from the center 162 of the outlet 138. A given baffle wall extends inwardly to a point where it meets a next adjacent baffle wall so that a pair of adjacent baffle walls define a triangular wedge, in plan view, as viewed in FIG. 14. The baffle walls 158 support the valve seal 148 and also define air passageways 163 from the inlet to the outlet such that when the pressure differential causes air to flow from the inlet to the outlet, the air forces the valve seal 148 against the baffle walls so that the air can flow radially outward along the upper surface of the valve seal and then down between the baffle walls to the outlet 138. When the greater air pressure is removed from the inlet, the pressure differential between the inlet and the outlet forces the valve seal 148 against the inner valve body 150 to seal the inlet. The valve is preferably one such as is marketed by Plast-O-Matic Valves, Inc., Model MPC 025 SI-NY.

In operation, the bottles are transported and inflated in the same manner as previously described, but the seal formed between the mouth of the bottle and the inlet for the top hold-down belt is substantially improved by the use of the valve. Additionally, the use of the various laminates, including the foam rubber and nylon wear layer 122 decreases wear, contaminants and drag on the top hold-down belt.

It is still preferred that bottle pressures be maintained at approximately 2–3 psi. Exemplary transport speeds for the bottles through movement of the conveyor belt 28 and the top hold-down belt 104 may range from 400 to 800 inches per minute for one labeling apparatus or 750 to 1500 inches per minute for another model. The distance from the manifold or inflate station to the labeling head may range from 12 to 18 inches, more or less, depending upon where the labeling head is positioned.

With the described valve arrangement, a relatively small valving arrangement is provided which can be used with a variety of bottle mouth sizes while still providing sufficient volume air flow for pressurizing the bottle upstream from the labeling head. For example, there are situations where the residence time for the valve under the manifold is short, such as for relatively high bottle transport rates, such that the bottle must be inflated relatively quickly, thereby necessitating a substantial flow rate. The valve used with the present invention provides a suitable flow rate. The valve, along with the sealing disc 130, also provides a sufficient seal to maintain the desired pressure during the transport time from the manifold 86 to the labeling station and during labeling. With the described apparatus, therefore, bottles can be inflated well prior to any labeling step and the pressure can be maintained in the bottle even while the bottle is transported to the labeling head and while the label is being applied. Inflation of the bottle, therefore, can be essentially a one-step operation, discrete and separate from the labeling step. The pressure does not need to be continually applied to the bottle.

It is to be understood that the embodiments of the invention disclosed herein are illustrative of the principles of the invention and that other modifications may be employed which are still within the scope of the invention. Accordingly, the present invention is not limited to those embodiments precisely shown and described in the specification but only by the following claims.

We claim:

1. A labeling apparatus for labeling containers such as bottles having an opening, the apparatus comprising:

a labeling station for applying labels to a container;

a continuous linear conveyor for transporting containers to present the containers before the labeling station at a given rate for placing a label on the container;

an inflation gas supply assembly for supplying an inflation gas to a single manifold for inflating a container;

a continuous top hold-down belt defining a manifold wall for sandwiching the container between the top hold-down belt and the continuous linear conveyor and for moving the top of the container at the same rate as the linear conveyor and including a plurality of walls defining respective openings in the top hold-down belt distributed evenly along the belt for inflating the containers; and a wear plate against which the belt moves when containers are sandwiched between the top hold-down belt and conveyor and further including a wall defining said manifold through the wear plate only upstream from the labeling station.

2. An inflation apparatus for labeling containers having openings comprising:

a labeling station;

a conveyer for moving a container from an upstream input position to a downstream output position;

a stationary gas supply orifice in communication with a single manifold upstream from said labeling station;

a continuous top hold down belt defining a manifold wall for sealing the opening of a container whereby the belt covers the opening without substantial insertion of the belt into the opening, and a wall in the belt defining an opening through the belt for flowing an inflation gas through the belt and into the container; and a valve in the wall for controlling the flow of gas through the belt by allowing flow of gas through the belt into the container but preventing flow of gas out of the container through the valve while the opening of the container is sealed by the belt and wherein the valve includes a flexible sealing element moveable toward a valve inlet for sealing the valve and moveable away from the valve inlet to allow flow of gas from the inlet to the outlet and into the container.

3. The apparatus of claim 2 wherein the valve further includes baffles for preventing the flexible sealing element from closing the outlet.

4. A label apparatus for labeling flexible containers having openings, the apparatus comprising:

a labeling station;

a continuous conveyor belt for transporting a container linearly from an upstream input to a downstream output;

a stationary gas supply orifice of relatively small diameter in communication with a manifold;

a laminated belt defining a manifold wall and forming an airtight sealing engagement with said gas supply orifice and said containers around the openings thereof;

said laminated belt having an opening to permit application of pressurized gas to said container during the time of movement of said belt while exposed to said gas supply orifice;

said belt being substantially flat on the side engaging said containers, to accommodate containers with different diameter openings; and the supply of gas for said container being applied upstream from said labeling station, with no gas pressure being supplied to said container at or subsequent to the labeling station;

whereby the airtight sealing of openings in the containers and the advance upstream inflation of the container with no inflation at said labeling station provides a stable inflated container for consistent and distortion free labeling of the container.

5. The apparatus of claim 4 wherein the continuous laminated hold-down belt is a laminate of neoprene and a nylon fabric.

* * * * *